United States Patent [19]

Karsas

[11] 3,920,977

[45] Nov. 18, 1975

[54] ARRANGEMENT AND METHOD FOR SWITCHING THE ELECTRONIC SUBSYSTEMS OF A COMMON CONTROL COMMUNICATION SWITCHING SYSTEM WITHOUT INTERFERENCE TO CALL PROCESSING

[75] Inventor: Martin A. Karsas, Chicago, Ill.

[73] Assignee: GTE Automatic Electric Laboratories Incorporated, Northlake, Ill.

[22] Filed: Sept. 10, 1973

[21] Appl. No.: 395,801

[52] U.S. Cl. .......................... 235/153 AE; 179/18 ES

[51] Int. Cl.$^2$ .......................... G06F 11/04

[58] Field of Search .......... 340/172.5; 179/18 ES; 235/153 AE

[56] References Cited

UNITED STATES PATENTS

| | | | |
|---|---|---|---|
| 3,252,149 | 5/1966 | Weida et al. | 340/172.5 |
| 3,303,474 | 2/1967 | Moore et al. | 340/172.5 |
| 3,312,947 | 4/1967 | Raspanti | 340/172.5 |
| 3,409,877 | 11/1968 | Alterman et al. | 340/172.5 |
| 3,444,528 | 5/1969 | Lovell et al. | 340/172.5 |
| 3,471,686 | 10/1969 | Connell | 235/153 AE |
| 3,487,173 | 12/1969 | Duthie et al. | 179/18 ES |
| 3,503,048 | 3/1970 | Avsan et al. | 340/172.5 |
| 3,517,171 | 6/1970 | Avizienis | 340/172.5 X |
| 3,517,174 | 6/1970 | Ossfeldt | 340/172.5 X |

*Primary Examiner*—Harvey E. Springborn
*Assistant Examiner*—Michael C. Sachs

[57] ABSTRACT

In a common control communication switching system, an arrangement for switching the electronic subsystems of the common çontrol in the event of a failure, without interference to call processing. In the system, the electronic subsystems include duplicated, synchronously operated logics and associated memories, with one only one logic being on line and communicating with the space shared subsystems of the system and its associated memory. The other logic is on standby and communicates only with its associated memory. A system time interval is established during which the on line logic is not communicating with the space shared subsystems and during which no data is transferred between the memories and the logics. In the event of a failure of a logic or memory, switching to the other logic and/or memory is accomplished during the established system time interval, so that the communication with the space shared subsystems is not effected.

4 Claims, 7 Drawing Figures

SYSTEM CONFIGURATION WITH LOGIC A & MTU-X ON LINE

SYSTEM CONFIGURATION WITH LOGIC-A ON REPAIR & LOGIC-B ON LINE & MTU-X ON LINE & BOTH MEMS. OPERATIONAL

SYSTEM CONFIG. WITH MEM.-B ON REPAIR
LOGIC-A & MTU-Y ON LINE

SYSTEM CONFIG. WITH LOGIC-B & MEM-B ON REPAIR
LOGIC- & MTU-Y ON LINE & MEM-A OPERATIONAL

ARRANGEMENT AND METHOD FOR SWITCHING THE ELECTRONIC SUBSYSTEMS OF A COMMON CONTROL COMMUNICATION SWITCHING SYSTEM WITHOUT INTERFERENCE TO CALL PROCESSING

BACKGROUND OF THE INVENTION

This invention relates, generally, to an improved centralized automatic message accounting system and, more particularly to an arrangement or method of switching the electronic subsystem thereof, without interference to call processing.

In the hereinafter described centralized automatic message accounting system, the common control is a duplicated synchronously operating system. The duplication is provided to insure backup in case of a failure in one of the logics and/or memories. The synchronization is provided to insure continuity of operation during an incurred failure in a logic and/or memory. Since both logics and memories are in synchronism, whatever is being done by one logic is done by the other logic and whatever is stored in one memory, is stored in the other. When one logic and/or memory fails, the other logic and/or memory assumes the control of the call processing and billing function, and the bad logic and/or memory is placed out of service.

The duplicated and synchronously operating logics consist of a marker, a call processor, a code processor, a memory subsystem, and a billing unit. The duplicated and synchronously operating memories consist of a core memory and associated read/write electronics.

The marker, call processor and billing unit, each must communicate with single entity (spaced shared) subsystems in order to accomplish their function. The marker operates with trunks, service circuits, and a switching matrix. The call processor operates with the service circuits, and the billing unit with a magnetic tape unit and the trunks. To prevent race conditions and interference between subsystems due to cable lengths, gate delays and electric failures, only one logic, i.e. only one marker, call processor and billing unit, actually communicates with the single entity (space shared) subsystems. The governing factor in which logic does communicate with the space shared subsystems is a maintenance controller which issues a command "on line" to one of the two logics. Whichever logic receives the on line command, is the logic which actually outputs information to the spaced shared subsystems.

Whenever a failure is detected by the maintenance controller in the on line logic, the maintenance controller performs a subsystem switch by removing the on line command from the bad logic and enabling the on line command to the other logic. This transferring of the on line command by the maintenance controller is done electronically without interruption to system operation.

As a result of detecting this failure in the logic, an additional switching function must be performed by the maintenance controller to prevent the contamination of the core memories by the bad logic. To prevent this contamination of the memories, the maintenance controller must inform the memory electronics of both memories to ignore the data that is to be written into the memory from the bad logic and to take the data from the other or good logic.

A similar function is performed by the maintenance controller when a memory is found to be bad. The maintenance controller again informs the memory electronics to ignore the data being written out of the bad core memory and give the data from the good core memory to both logics. The commands that are generated by the maintenance controller to accomplish the switching between the logics and memories is "transfer logic to memory" for a bad logic and transfer memory to logic for a bad memory. Again, the objective of the maintenance controller is to accomplish this switching task electronically with no interference to the communication between the logics and the memories.

Accordingly, it is an object of the present invention to provide an arrangement or method for switching the logic and/or memories of a redundant synchronously operating common control system, without effecting the communication or data transfer to spaced shared subsystems.

Other objects of the invention will in part be obvious and will in part appear hereinafter.

The above objective is accomplished by providing a specific system time during which the markers, call processors and billing units are not outputing data to the space shared subsystems and when the read/write electronics are not reading or writing data in or out of the core memories. In the disclosed embodiment, all maintenance switching is accomplished during a clock pulse Y (CPY) which is one of four system clock pulses of one-half microseconds in duration. To insure that the maintenance controller is performing the switching functions only during the clock pulse CPY, the maintenance controller derives its clock pulse CPY from the same sine wave as the rest of the system.

In order to illustrate this clock pulse CPY switching feature, assume that the maintenance controller through a variety of system self-checking features, decides that logic A which is on line is bad. It immediately changes its status flip-flops by setting the logic B on line flip-flop and resetting the logic A on line flip-flop. Both of these flip-flops are activated and change states on clock pulse CPY. The setting and resetting of these flip-flops will also remove the generation of the on line command to logic A and enable the on line command to the logic B. Thus the control of the communication of the marker, call processor and the billing unit is switched from logic A to logic B. Simultaneously, the maintenance controller also generates the transfer logic to memory commands to both memories to insure that the data to be written into both memories comes from logic B. As a result, since no subsystem uses clock pulse CPY to communicate with the space shared equipments, or to read and/or write into memory, normal data transfer is not interrupted and system recovery from a failure is accomplished.

For a fuller understanding of the nature and objects of the invention, reference should be had to the following detailed description taken in connection with the accompanying drawings.

BRIEF DESCRIPTION OF THE DRAWINGS

Similar reference characters refer to similar parts throughout the several views of the drawings.

DESCRIPTION OF THE INVENTION

Figure 1:
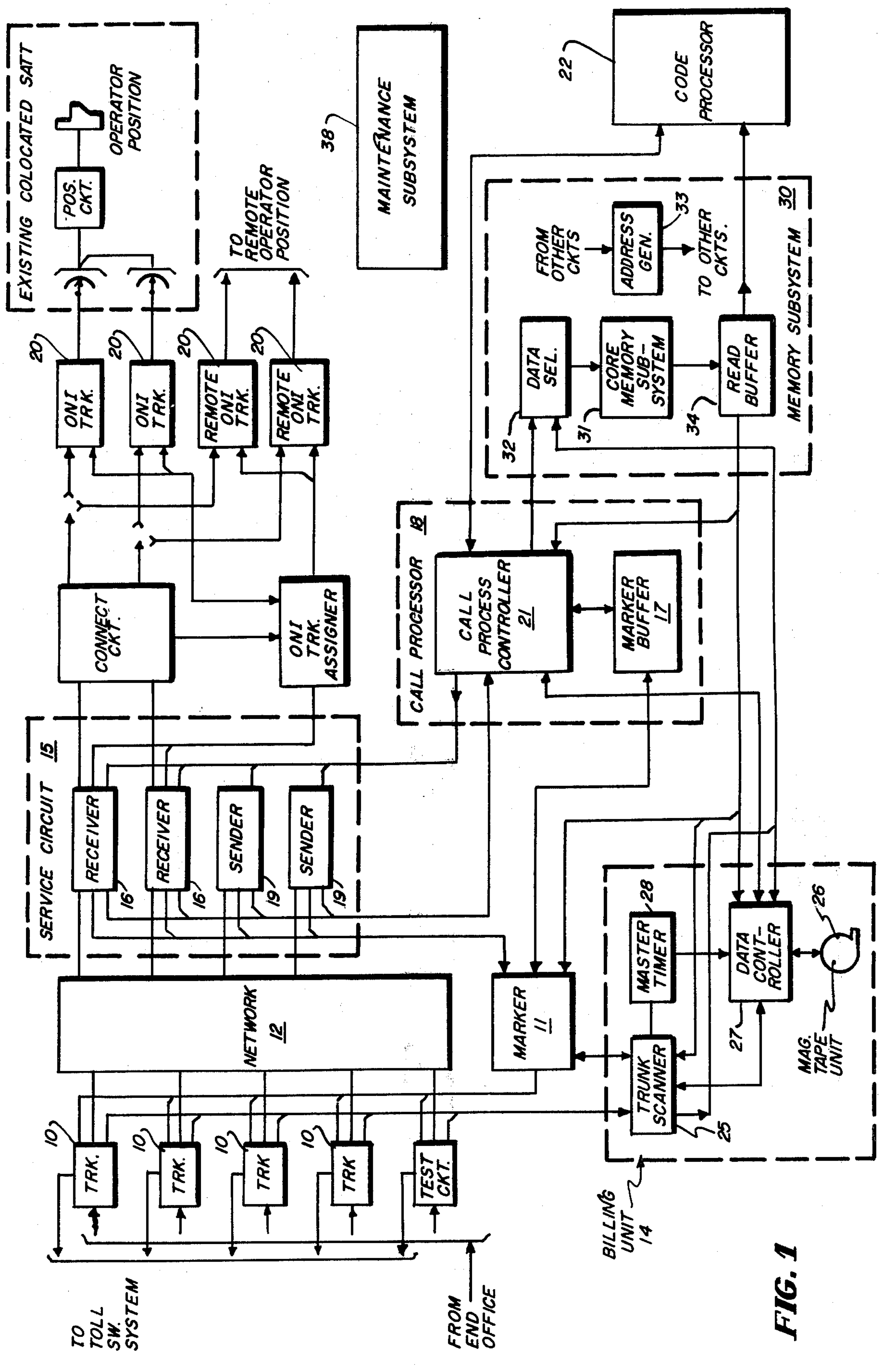
FIG. 1 is a functional block diagram of the centralized automatic message accounting system.

Referring now to the drawings, in FIG. 1 the centralized automatic message accounting system is illustrated in block diagram, and the functions of the principal equipment elements can be generally described as follows. The trunks 10, which may be either multi-frequency (MF) trunks or dial pulse (DP) trunks, provide an interface between the originating office, the toll switching system, the marker 11, the switching network 12, and the billing unit 14. The switching network 12 consists of three stages of matrix switching equipment between its inlets and outlets. A suitable distribution of links between matrices are provided to insure that every inlet has full access to every outlet for any given size of the switching network. The three stages, which consist of A, B and C crosspoint matrices, are interconnected by AB and BC links. The network provides a minimum of 80 inlets, up to a maximum of 2000 inlets and 80 outlets. Each inlet extends into an A matrix and is defined by an inlet address. Each outlet extends from a C matrix to a terminal and is defined by an outlet address.

Each full size network is divided into a maximum of 25 trunk grids on the inlet side of the network and a service grid with a maximum of 16 arrays on the outlet side of the network. The trunk grids and service grid within the networks are interconnected by the BC link sets of 16 links per set. Each MF trunk grid is provided for 80 inlets. Each DP trunk grid is provided for 40 inlets. The service grid is provided for a maximum of 80 outlets. A BC link is defined as the interconnection of an outlet of a B matrix in a trunk grid and an inlet of a C matrix in the service grid.

The marker 11 is the electronic control for establishing paths through the electromechanical network. The marker constantly scans the trunks for a call for service. When the marker 11 identifies a trunk with a call for service, it determines the trunk type, and establishes a physical connection between the trunk and a proper receiver 16 in the service circuits 15.

The trunk identity and type, along with the receiver identity, are temporarily stored in a marker buffer 17 in the call processor 18 which interfaces the marker 11 and the call processor 18.

When the call processor 18 has stored all of the information transmitted from a receiver, it signals the marker 11 that a particular trunk requires a sender 19. The marker identifies an available sender, establishes a physical connection from the trunk to the sender, and informs the call processor 18 of the trunk and sender identities.

The functions of the receivers 16 are to receive MF 2/6 tones or DP signals representing the called number, and to convert them to an electronic 2/5 output and present them to the call processor 18. A calling number is received by MF 2/6 tones only. The receivers will also accept commands from the call processor 18, and interface with the ONI trunks 20.

The function of the MF senders are to accept commands from the call processor 18, convert them to MF 2/6 tones and send them to the toll switch.

The call processor 18 provides call processing control and, in addition, provides temporary storage of the called and calling telephone numbers, the identity of the trunk which is being used to handle the call, and other necessary information. This information forms part of the initial entry for billing purposes in a multi-entry system. Once this information is passed to the billing unit 14, where a complete initial entry is formated, the call will be forwarded to the toll switch for routing.

The call processor 18 consists of the marker buffer 17 and a call processor controller 21. There are 77 call stores in the call processor 18, each call store handling one call at a time. The call processor 18 operates on the 77 call stores on a time-shared basis. Each call store has a unique time slot, and the access time for all 77 call stores is equal to 39.4 MS, plus or minus 1 percent.

The marker buffer 17 is the electronic interface between the marker 11 and the call processor controller 21. Its primary functions are to receive from the marker 11 the identities of the trunk, receiver or sender, and the trunk type. This information is forwarded to the appropriate call store.

The operation of the call process controller revolves around the call store. The call store is a section of memory allocated for the processing of a call, and the call process controller 21 operates on the 77 call stores sequentially. Each call store has eight rows and each row consists of 50 bits of information. The first and second rows are repeated in rows 7 and 8, respectively. Each row consists of two physical memory words of 26 bits per word. Twenty-five bits of each word are used for storage of data, and the 26th bit is a parity bit.

The call processor controller 21 makes use of the information stored in the call store to control the progress of the call. It performs digit accumulation and the sequencing of digits to be sent. It performs fourth digit 0/1 blocking on a six or 10 digit call. It interfaces with the receivers 16, the senders 19, the code processor 22, the billing unit 14, and the marker buffer 17 to control the call.

The main purpose of the code processor 22 is to analyze call destination codes in order to perform screening, prefixing and code conversion operations of a nature which are originating point dependent. This code processing is peculiar to the needs of direct distance dialing (DDD) originating traffic and is not concerned with trunk selection and alternate routing, which are regular translation functions of the associated toll switching machine. The code processor 22 is accessed only by the call processor 18 on a demand basis.

The billing unit 14 receives and organizes the call billing data, and transcribes it onto magnetic tape. A multi-entry tape format is used, and data is entered into tape via a tape transport operating in a continuous recording mode. After the calling and called director numbers, trunk identity, and class of service information is checked and placed in storage, the billing unit 14 is accessed by the call process controller 21. At this time, the call record information is transmitted into the billing unit 14 where it is formated and subsequently recorded on magnetic tape. The initial entry will include the time. Additional entries to the billing unit 14 contain answer and disconnect information.

The trunk scanner 25 is the means of conveying the various states of the trunks to the billing unit 14. the trunk scanner 25 is connected to the trunks by a highway extending from the billing unit 14 to each trunk.

Potentials on the highway leads will indicate states in the trunks.

Each distinct entry (initial, answer, disconnect) will contain a unique entry identity code as an aid to the electronic data processing (EDP) equipment in consolidating the multi-entry call records into toll billing statements. The billing unit 14 will provide the correct entry identifier code. The magnetic tape unit 26 is comprised of the magnetic tape transport and the drive, storage and control electronics required to read and write data from and to the nine channel billing tape. The read function will allow the tape unit to be used to update the memory.

The recorder operates in the continuous mode at a speed of 5 inches per second, and a packing density of 800 bits per inch. Billing data is recorded in a multi-entry format using a nine bit EBCDIC character (extended binary coded decimal interchange code). The memory subsystem 30 serves as the temporary storage of the call record, as the permanent storage of the code tables for the code processor 22, and as the alterable storage of the trunk status used by the trunk scanner 25.

The core memory 31 is composed of ferrite cores as the storage elements, and electronic circuits are used to energize and determine the status of the cores. The core memory 31 is of the random access, destructive readout type, 26 bits per word with 16 K words.

For storage, data is presented to the core memory data registers by the data selector 32. The address generator 33 provides the address or core storage locations which activate the proper read/write circuits representing one word. The proper clear/write command allows the data selected by the data selector 32 to be transferred to the core storage registers for storage into the addressed core location.

For readout, the address generator 33 provides the address or core storage location of the word which is to be read out of memory. The proper read/restore command allows the data contained in the word being read out, to be presented to the read buffer 34. With a read/restore command, the data being read out is also returned to core memory for storage at its previous location.

The method of operation of a typical call in the system, assuming the incoming call is via an MF trunk can be described as follows. When a trunk circuit 10 recognizes the seizure from the originating office it will provide an off-hook to the originating office and initiate a call-for-service to the marker 11. The marker 11 will check the equipment group and position scanners to identify the trunk that is requesting service. Identification will result in an assignment of a unique four digit 2/5 coded equipment identity number. Through a trunk-type determination, the marker 11 determines the type of receiver 16 required and a receiver/sender scanner hunts for an idle receiver 16. Having uniquely identified the trunk and receiver, the marker 11 makes the connection through the three-stage matrix switching network 12 and requests the marker buffer 17 for service.

The call-for-service by the marker 11 is recognized by the marker buffer 17 and the equipment and receiver identities are loaded into a receiver register of the marker buffer 17. The marker buffer 17 now scans the memory for an idle call store to be allocated for processing the call, under control of the call process controller 21. Detection of an idle call store will cause the equipment and receiver identities to be dumped into the call store. At this time, the call process controller 21 will instruct the receiver 16 to remove delay dial and the system is now ready to receive digits.

Upon receipt of a digit, the receiver 16 decodes that digit into 2/5 code and times the duration of digit presentation by the calling end. Once it is ascertained that the digit is valid, it is presented to the call processor 18 for a duration of no less than 50 milliseconds of digit and 50 milliseconds of interdigital pause for storage in the called store. After receipt of "ST", the call processor controller 21 will command the receiver 16 to instruct the trunk circuit 10 to return an off-hook to the calling office, and it will request the code processor 22.

The code processor 22 utilizes the called number to check for EAS blocking and other functions. Upon completion of the analysis, the code processor 22 will send to the call processor controller 21 information to route the call to an announcement or tone trunk, at up to four prefix digits if required, or provide delete information pertinent to the called number. If the call processor controller 21 determined that the call is an ANI call, it will receive, accumulate and store the calling number in the same manner as was done with the called number. After the call process controller 21 receives ST, it will request the billing unit 14 for storage of an initial entry in the billing unit memory. It will also command the receiver 16 to drop the trunk to receiver connection. The call processor controller 21 now initiates a request to the marker 11 via the marker buffer 17 for a trunk to sender connection. Once the marker 11 has made the connection and has transferred the identities to the marker buffer 17, the marker buffer will dump this information into the appropriate call store. The call processor controller 21 now interrogates the sender 19 for information that delay dial has been removed by the routing switch (crosspoint tandem or similar). Upon receipt of this information the call processor controller 21 will initiate the sending of digits including "KP" and ST. The call process controller 21 willl control the duration of tones and interdigital pause. After sending of ST, the call processor 18 will await the receipt of the matrix release signal from the sender 19. Receipt of this signal will indicate that the call has been dropped. At this time, the sender and call store are returned to idle, ready to process a new call.

The initial entry information when dumped from the call store is organized into the proper format and stored in the billing unit memory. Eventually, the call answer and disconnect entries will also be stored in the billing unit memory. The initial entry will consist of approximately 40 characters and trunk scanner 25 entries for answer or disconnect contain approximately 20 characters. These entries will be temporarily stored in the billing unit memory until a sufficient number have been accumulated to comprise one data block of 1370 characters. Once the billing unit memory is filled, the magnetic tape unit 26 is called and the contents of the billing unit memory are recorded onto the magnetic tape.

The final result of actions taken by the system on a valid call will be a permanent record of billing information stored on magnetic tape in multi-entry format consisting of initial, answer, and disconnect or forced disconnect entries.

Answer timing, force disconnect timing and other timing functions such as, for example, a "grace period" timing interval on answer, in the present system, are provided by the trunk timers. These trunk timers are memory timers, and an individual timer is provided for each trunk in a trunk scanner memory which comprises a status section and a test section.

The status section contains 1 word per ticketed trunk. Each word contains status, instruction, timing and sequence information. The status section also provides 1 word per trunk group which contains the equipment group number, and an equipment position tens word that identifies the frame. A fully equipped status section requires 2761 words of memory representing 2000 trunks spread over 60 groups plus a status section "start" word. As each status word is read from memory, it is stored in a trunk scanner read buffer (not shown). The instruction is read by a scanner control to identify the contents of the word. The scanner control logic acts upon the timing, sequence and status information, and returns the updated word to the trunk scanner memory and it is written into it for use during the next scanner cycle.

The test section contains a maximum of 83 words: a start word, a last programmed word, 18 delay words, two driver test words, one end-test word and one word for each equipment group. The "start test" word causes a scan point test to begin. The delay words allow time for scan point filters to charge before the trunk groups are scanned, with the delay words containing only instructional data. The equipment group wrods contain a two digit equipment group identity and five trunk frame equipped bits. The trunk frame equipped bits (1 per frame) indicates whether or not a frame exists in the position identified by its assigned bit. The delay words following the equipment group allow the scan point filters to recharge before the status section of memory is accessed again for normal scanning. The Last Program word inhibits read and write in the trunk scanner memory until a trunk scanner address generator has advanced through enough addresses to equal the scanner cycle time. When the cycle time expires, the trunk scanner address generator returns to the start of the status section of memory and normal scanning recommences.

The trunk scanner memory and the trunk scanner read buffer are not part of the trunk scanner 25, however, the operation thereof is controlled by a scanner control which forms a part of the trunk scanner 25 of the billing unit 14. The trunk scanner 25 maintains an updated record of the status of each ticketed trunk, determines from this status when a billing entry is required, and specifies the type of entry to be recorded. The entry includes the time it was initiated and the identification of its associated trunk.

Scanning is performed sequentially, by organizing the memory in such a manner that when each word is addressed, the trunk assigned to that address is scanned. This causes scanning to progress in step with the trunk scanner address generator. During the address advance interval, the next scanner word is addressed and, during the read interval, the word is read from memory and stored in the trunk scanner read buffer. At this point, the trunk scanner 25 determines the operations to be performed by analyzing the word instruction.

As indicated above, scanning is performed sequentially. If all trunks in all groups are scanned in numerical sequence beginning with trunk 0000, scanning would proceed in the following manner:

Step 1. Trunk 0000 located in frame 00 (lineup 0, column 0) in the top file, leftmost card position would be scanned first.

Step 2. All trunks located in frame 00 and the leftmost card position would be scanned next from the top file to the bottom.

Step 3. Scanning advances to frame 01 (lineup 0, column 1) and proceeds as in Step 2.

Step 4. Scanning proceeds as in Step 3 until frame 04 has been scanned.

Step 5. The scanner returns to frame 00 and Step 2 is repeated for the next to leftmost card position.

Step 6. The sequence just described continues until all ten card positions in all five columns have been examined.

Step 7. The entire process is repeated in lineups 1 through 5.

When a memory word instruction identifies a trunk group word, the status receivers are cleared to prepare for scanning the trunks specified in the group word. The trunk group digits stored in the trunk scanner read buffer (TSRB) are transferred into the equipment group register.

After the trunk group number is decoded, it is transformed into binary code decimals (BCD), processed through a 1-out-of-N check circuit, and applied to the AC bus drivers (ACBD). The drivers activate the scan point circuits via the group leads and the trunk status is returned to the receivers.

A group address applied to the drivers causes the status of all trunks in 1 lineup and 1 card position and all columns to be returned to the receivers. The group tens digit specifies the trunk frame lineup and the group units digit identifies the card slot.

When a status word is read from memory, it sets the previous count of a trunk timer (TT) into the trunk timer.

If the trunk is equipped and the forced disconnect sequence equals 2 (*FDS*=2), a request to force release the trunk is transmitted to the marker 11. If FDS does not equal 2, the present condition of the ticketing contacts in the trunk is tested. If the instruction indicates that the trunk is in an updated condition (the trunks associated memory word was reprogrammed) it is tested for idle. If the trunk is idle, its instruction is changed to denote that it is ready for new calls. If the trunk is not idle, no action is taken and the trunk scanner 25 proceeds to the next trunk.

If the trunk is not in the updated condition and *FDS*=3, the trunk is tested for idle. If the trunk is idle, FDS is set to 0 and TT is reset.

If FDS does not equal 3 and a match exists between the present contact status and the previous contact status stored in memory (bits 5 and 6) of the FDS memory bits are inspected for a count equal to 1. If *FDS*=1, TT is reset and the memory contact status is updated. If FDS does not equal 1, TT is not reset.

During any analysis of a trunk status, a change in the contact configuration of a trunk is not considered valid until it has been examined twice.

One bit (SFT) is provided in each memory status word to indicate whether or not a change in status of the trunk was detected during the previous scan cycle.

When a change in status is detected, SFT is set to 1. If *SFT*=1 on the next cycle, the status is analyzed and SFT is set to 0.

If a mismatch exists between the present contact condition and that previously stored in memory, the status has changed and a detailed examination of the status is started.

If $CT=1$, the trunk is busy and so the previous condition of the contact is inspected. If the trunk previously was idle, $CM=0$. Before continuing the analysis, it must be determined if this is the first indication of change in the trunk status by examining the "second look" bit (SFT). If $SFT=0$, it is set to equal 1, and the analysis of this trunk status is discontinued until the next scanner cycle. If $SFT=1$, the memory status is updated and SFT is set to equal 0.

If $CT=1$, the trunk is cut through and CM is inspected to determine if the memory status was updated. If $CM=1$, the GT contact status must differ from GM since it was already determined that a mismatch exists. If $GT=0$, answer has not occurred. If $GT=1$, and this condition existed during the previous scan cycle, $SFT=1$ also. If these conditions are true and FDS does not equal 1, TT is advanced and answer timing begins. If these conditions persist for eight scanner cycles (approximately 1 second), answer is confirmed and an entry will be stored in the trunk scanner formater (TSF). If answer is aborted (possibly hookswitch fumble) before the 1 second answer time (time is adjustable) expires, TT remains at its last count. When the answer condition returns, answer timing continues from the last TT count. Thus, answer timing is cumulative.

After an answer entry is stored, which includes the TT count, TT is reset, SFT is set to 0, and the new contact status is written into memory.

If a mismatch exists and $CT=0$, the previous state of this contact is inspected by examining bit 5 in the trunk scanner read buffer (TSRB). If $CM=1$, the state of the terminating end of the trunk is tested. If $GT=1$, then the condition of the trunk has just changed from answer to disconnect. If this condition existed during the previous scan cycle, $SFT=1$ and a disconnect entry is stored in the TSF.

After the disconnect entry is stored, which includes the TT count, TT is reset, FDS and SFT are set to 0, and the new status is written into memory.

If a mismatch exits and the originating end of a trunk is not released, both CT and CM equal 1. If $GT=0$ after the previous scan cycle, FDS is tested. If this change just occurred, FDS does not equal 1. Since FDS does not equal 1, it will be set equal to 1 and TT will reset. $FDS=1$ indicates that forced disconnect timing is in progress.

While the conditions just described exist, i.e., mismatch, $CT=1$, $CM=1$, $GT=0$ and $FDS=1$, TT will advance 1 count during each scanner cycle, if one half second has elapsed since the last scan cycle. TT will continue to advance until it reaches a count of 20 (approximately 10 seconds) when a forced disconnect entry will be stored in the TSF.

When the entry is stored, FDS is set at 2 indicating that the trunk is to be force released. After the entry is stored, which includes the TT count, TT is reset, SFT is set to 0, and the new status is written into memory.

After the status and test sections of the memory have been accessed, the Last Program word is read from memory and stored in the trunk scanner read buffer. This word causes read/write in the trunk scanner portion of memory to be inhibited and deactivates the scan point test. The trunk scanner address generator will continue to advance, however, until sufficient words have been addressed to account for one scan cycle. When a predetermined address, the Last Address, is reached, block read/write is removed and the address generator returns to the Start Address (First Program Word) of the scanner memory.

As indicated above, the common control of the centralized automatic message accounting system is a duplicated synchronously operating system, the duplication being provided to insure backup in case of failure in one of the logics and/or memories and with the synchronization being provided to insure continuity of operation during an incurred failure in a logic and/or memory.

Figure 2:
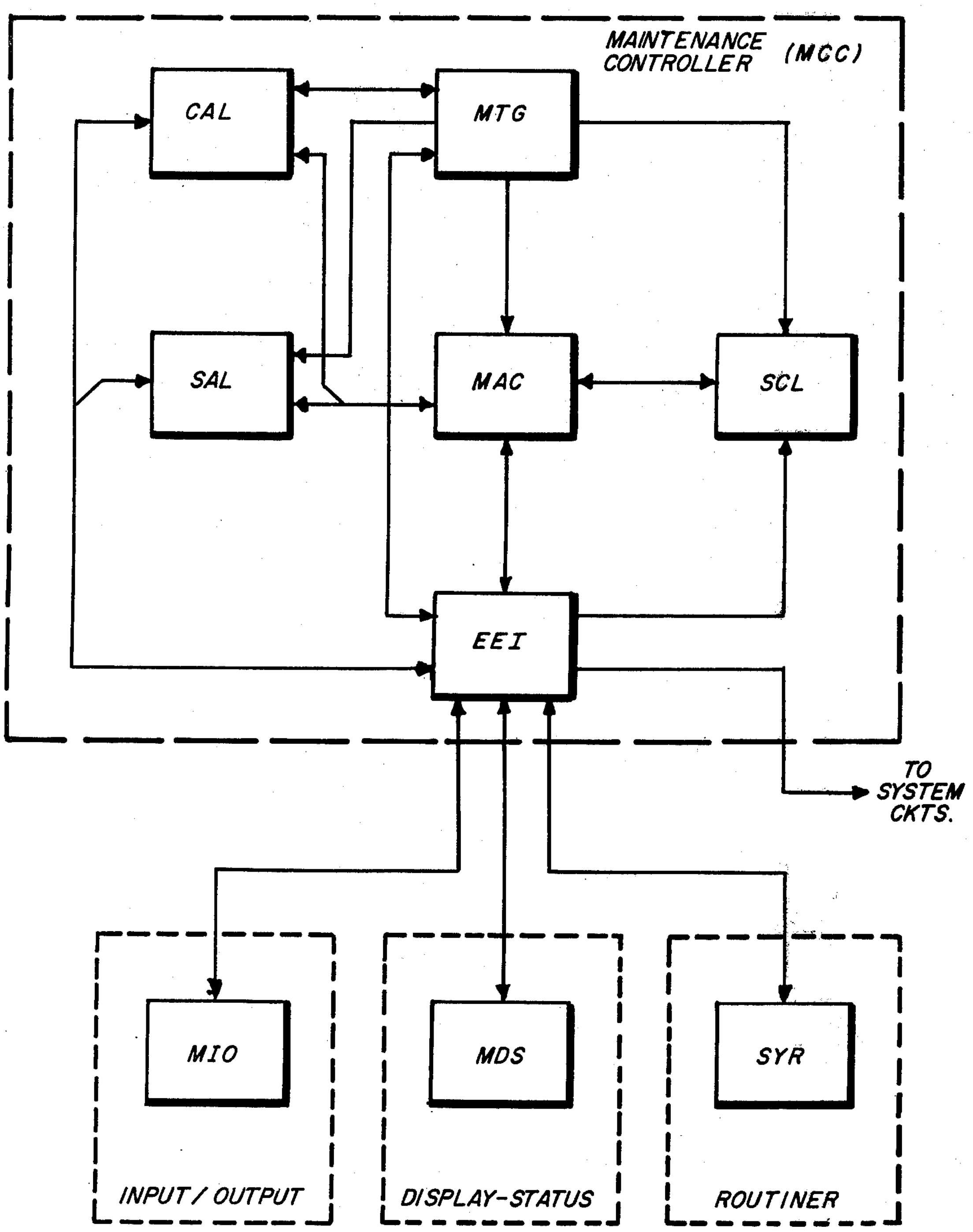
FIG. 2 is a block diagram schematic of the maintenance controller.

The maintenance subsystem 38 (FIG. 1) is divided into four major functional blocks of logic which, as can be best seen in FIG. 2, comprise a maintenance controller circuit MCC, a maintenance input/output device MIO, a system routiner SYR, and a maintenance display and status MDS.

The maintenance controller MCC is included in the centralized automatic message accounting system to control the operation of the maintenance subsystem during trouble occurrences in the logics, memories, or tape units. The maintenance controller MCC continuously monitors test point comparisons (CAL), self check points (SAL), and routine results of a maintenance analysis control (MAC). When a test point comparison discrepancy is observed, or when a self check or routine failure is registered, the maintenance analysis control MAC is activated and an analysis of the trouble is begun. The analysis is done by the maintenance analysis control MAC in a sequential order utilizing ten sequence states. If during the analysis, a specific task is to be performed by a different circuit within the maintenance subsystem, that circuit is called into service by the maintenance analysis control MAC.

When the trouble analysis results indicate that a reconfiguration is required, a status configuration logic SCL is activated to perform the subsystem status change and reconfiguration. When the reconfiguration is completed, the maintenance analysis control MAC will analyze the validity of the new configuration and initiate a request to the maintenance input/output device MIO for a fault printout.

If the trouble could not be isolated on the initial analysis and it was caused by a comparison discrepancy, the maintenance analysis control MAC will inform the system routiner SYR that a test call must be placed into the system. Failure of this call will cause the maintenance analysis control MAC to initiate a fail request to the status configuration logic SCL of the on line logic. Completion of this call will cause the maintenance analysis control MAC to initiate a fail request to the status configuration logic SCL of the redundant logic.

Once a subsystem is placed "on repair", all self checks from that subsystem and comparison between the subsystem and its compliment will be ignored by the maintenance controller circuit MCC.

The two logic subsystems, each comprised of the marker call processor, billing unit, code processor, and memory, operate synchronously with one logic on line and the other redundant.

When a failure occurs in one of the logics, the status configuration logic SCL, on command from the maintenance analysis control MAC, performs a reconfiguration and places the bad logic on repair, and the good logic on line driving both memories. When a logic is repaired, it is manually released from repair. The status configuration logic SCL places that logic in check, then after seven seconds it is returned to redundant and resumes driving its associate memory.

The logic can assume any of the following states and these states are retained in flip-flops in the status configuration logic SCL.

a. On-line—A logic is fully operational and is driving the peripheral equipment, the On-line MTU, one or both memories, and is driven by an Operational memory.

b. Redundant—A logic is fully operational and is operating in synchronism with the On-line logic. It is driven by a memory and is driving a memory.

c. Repair—A logic has a failure and is not operational, but it continues to be driven by an Operational memory.

d. Check—A logic is put in this state for 4 seconds prior to being returned to an operational state from Repair. It continues to be driven by an Operational memory, but does not drive a memory.

The two memories operate in synchronism. During normal operation, both memories will be in operational states, each driving its associated logic. They in turn are driven by operational logics. When a failure occurs, that memory is placed on repair, and it is discontinued from driving a logic. It is placed in check for four seconds prior to being released from repair to operational.

The memories can assume any one of the following states:

a. Operational—A memory is in good working order and is driving one or both logics depending on the state of the other memory. It is also driven by a good logic.

b. Repair—A memory has a failure. It is inhibited from driving a logic but continues to be driven by a good logic.

c. Check—A memory is put in this state for 4 seconds prior to being returned to Operational state. In this state, the configuration remains the same as if the memory was on Repair.

There are two magnetic tape units MTU normally operating with one on-line and the other on standby. The tape units are not synchronously operated. One tape unit processes billing data and it is considered to be on-line. The other tape unit will be idle ready to assume the on-line state and it is considered to be in stand-by. When a failure is detected in a tape unit or when it is manually removed from operation, the tape unit is placed on repair. When a tape unit is released from repair, it will be placed in check for four seconds. If no failures are detected, the tape unit is placed on standby.

The states that the magnetic tape units MTU can assume are as follows:

a. On-line—Fully operational and is receiving billing data from the On-line logic and is sending control commands to both logics.

b. Standby—Fully operational, but it is not communicating with either logic. It is ready to assume the On-line state if the other tape unit fails.

c. Repair—Out of Service due to a failure or a manual out of service request. In this state, it cannot be placed On-line. But it can be used for loading the memory if it is still in working order.

d. Check—A transient state assumed by a MTU for 4 seconds when it is released manually from Repair. After 4 seconds, if there are no failures detected, the MTU is returned from Check to Standby.

The operating objective of the maintenance controller circuit MCC is to insure that an operating subsystem of each duplicated group is controlling the processing and billing of calls.

To insure that this objective is met, the maintenance controller circuit uses the status configuration logic SCL to maintain subsystem status and perform the required electronic subsystem switching of the logics, clear memories, and tape units.

The concepts employed in the decision making for a subsystem switching are:

a. One logic and tape unit will always be on-line and at least one memory operational. If these conditions cannot be met, the system has a catastrophic failure.

b. A failed logic, memory, or tape unit will not input information to any operational system.

c. A failed logic or memory will receive information from an operational memory or logic, respectively.

d. Only the on-line logic will input information to the peripheral equipment and tape unit.

e. Only one logic can be on-line at any one instant in times.

f. A memory can simultaneously input data to both logics, but can receive data from only one logic.

g. A logic can simultaneously input data to both memories, but can receive data from only one memory.

h. Only the on-line magnetic tape unit MTU will input data to both logics.

Figure 3:
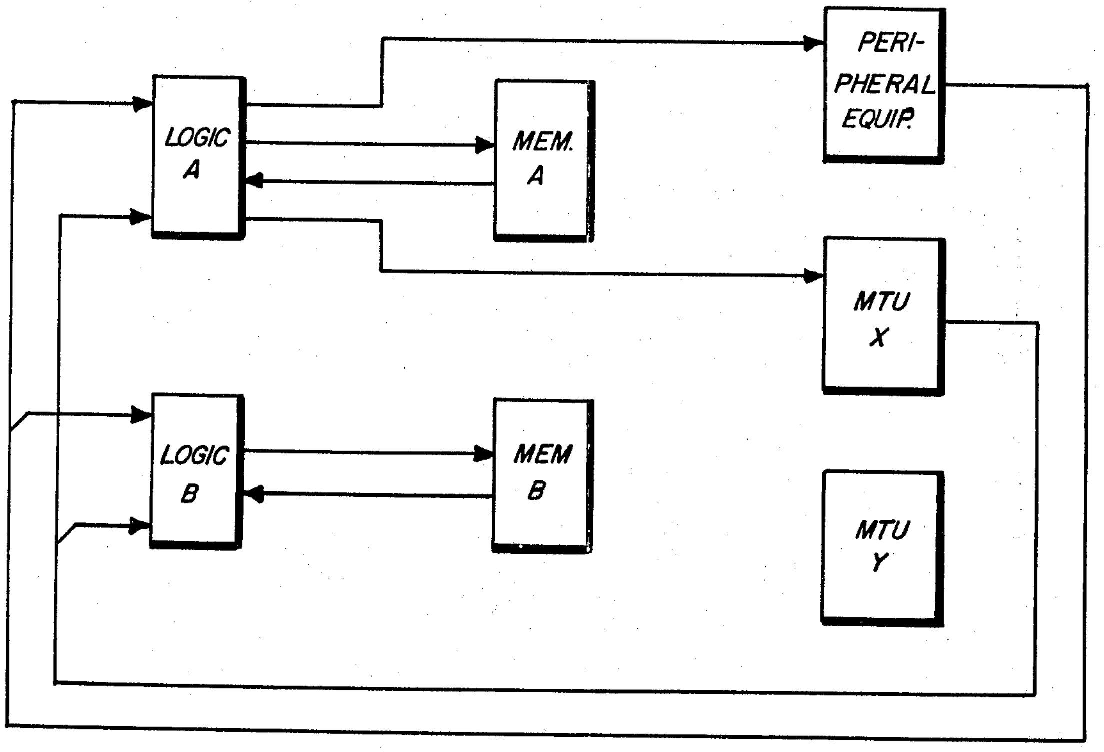
FIGS. 3–6 are block diagram schematics illustrating the system configuration with the various logics, memories and magnetic tape units on line.

These various system configurations are illustrated in FIGS. 3–6. In FIG. 3, both the logics A and B and the memories A and B associated with them, respectively, are operational, and logic A on-line and the magnetic tape unit MTU-X both being on line. In this system configuration, it can be seen that logic A outputs information or data to the peripheral equipment and to the magnetic tape unit MTU-X, while the logic B outputs to and receives information from only the memory B. Both the logic A and B receive information from the peripheral equipment and the magnetic tape unit MTU-X so that both of these logics receive the same information.

Figure 4:
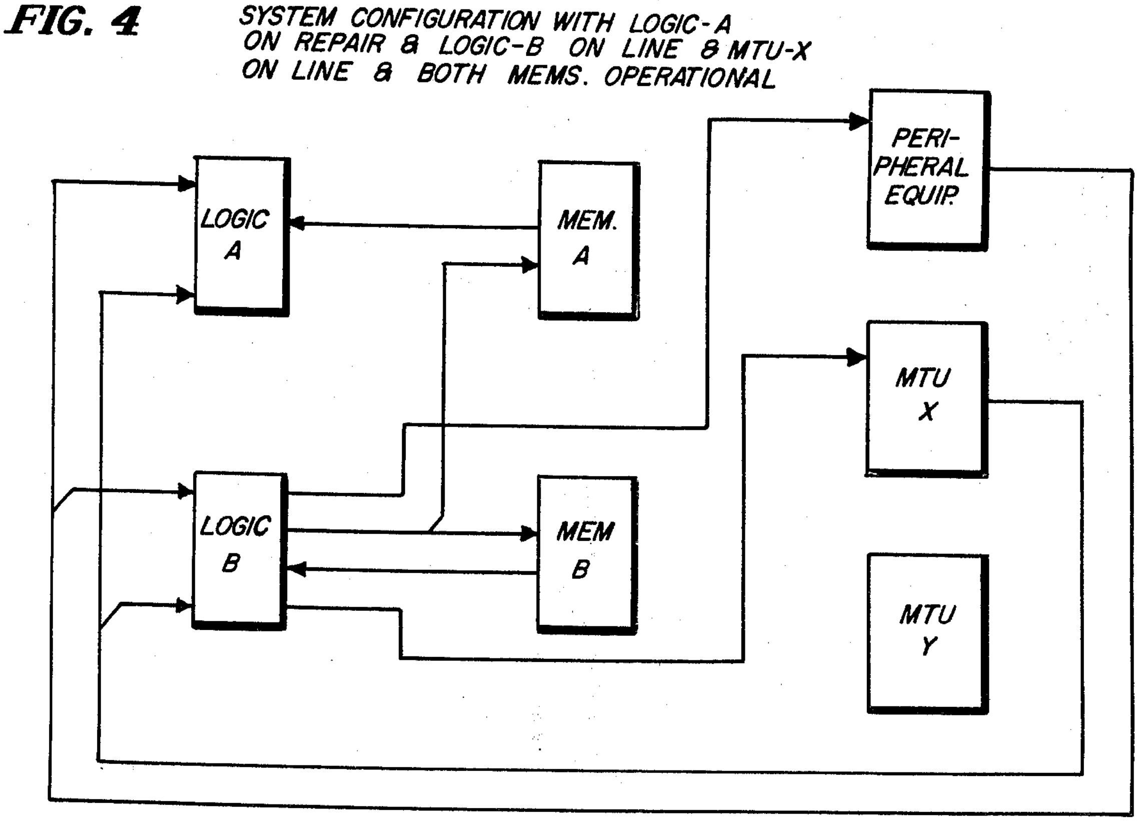

In FIG. 4, the system configuration is such that logic A is on repair and logic B is on-line, as is the magnetic tape unit MTU-X. Both of the memories A and B are operational. In this system configuration, only logic B outputs information to the peripheral equipment and to the magnetic tape unit MTU-X. Both the logics A and B receive input information from the peripheral equipment and the magnetic tape unit MTU-X, however, in this case, logic B inputs information to both the memory A and the memory B, so that both memories receive and store the same information.

Figure 5:
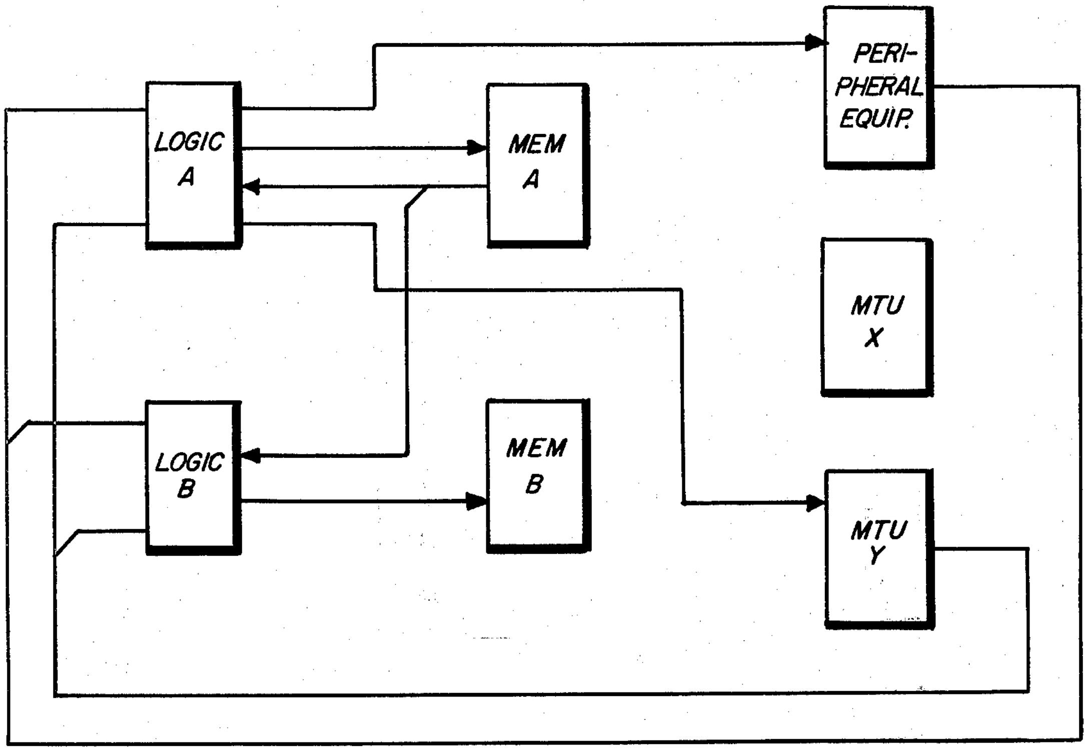

In FIG. 5, the system configuration is such that memory B is on repair, both logics A and B are operational with logic A being on-line. The magnetic tape unit MTU-Y also is on-line. In this system configuration, only logic A outputs information to the peripheral equipment and to the magnetic tape unit MTU-Y. Both logics A and B receive input information from the peripheral equipment and the magnetic tape unit MTU-Y. Also, since memory B is on repair, memory A inputs information to both the logic A and logic B.

Figure 6:
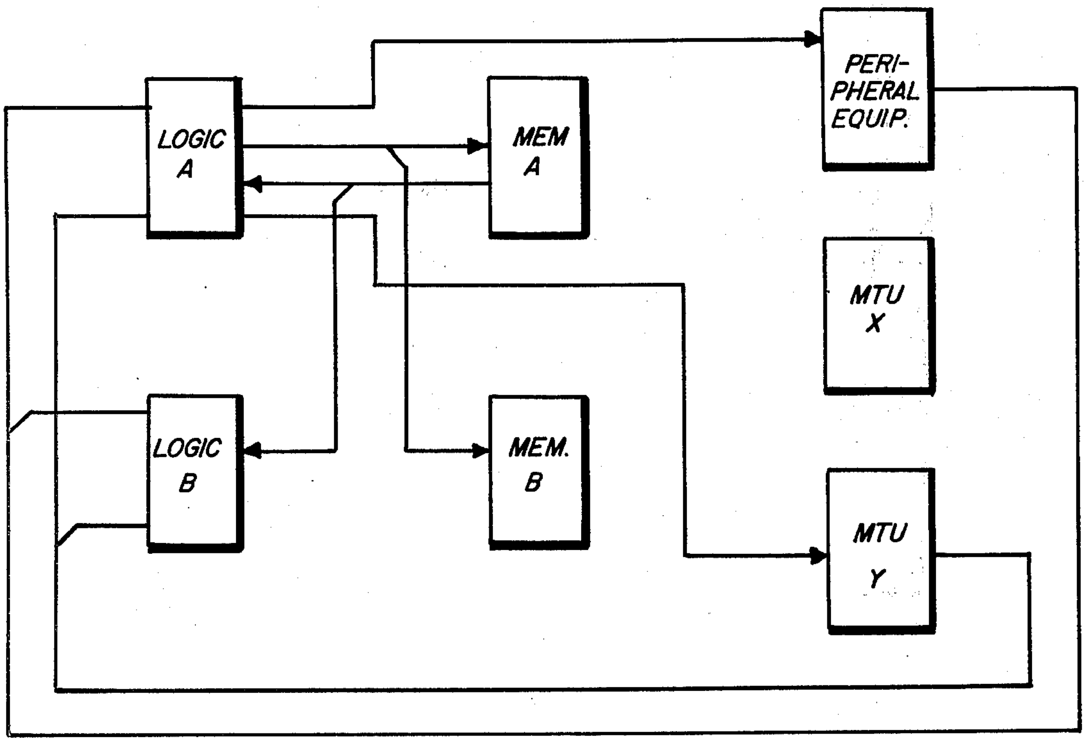

In FIG. 6, both the logic B and the memory B are on repair, and the memory A is operational. The logic A and the magnetic tape unit MTU-Y are on-line. In this system configuration, logic A outputs information to the peripheral equipment and to the magnetic tape unit MTU-Y. Logic A also inputs information to both memories A and B, while only memory A outputs information to both the logic A and the logic B. Both logics A and B, as before, receive input information from the peripheral equipment and the magnetic tape unit MTU-Y.

Figure 7:
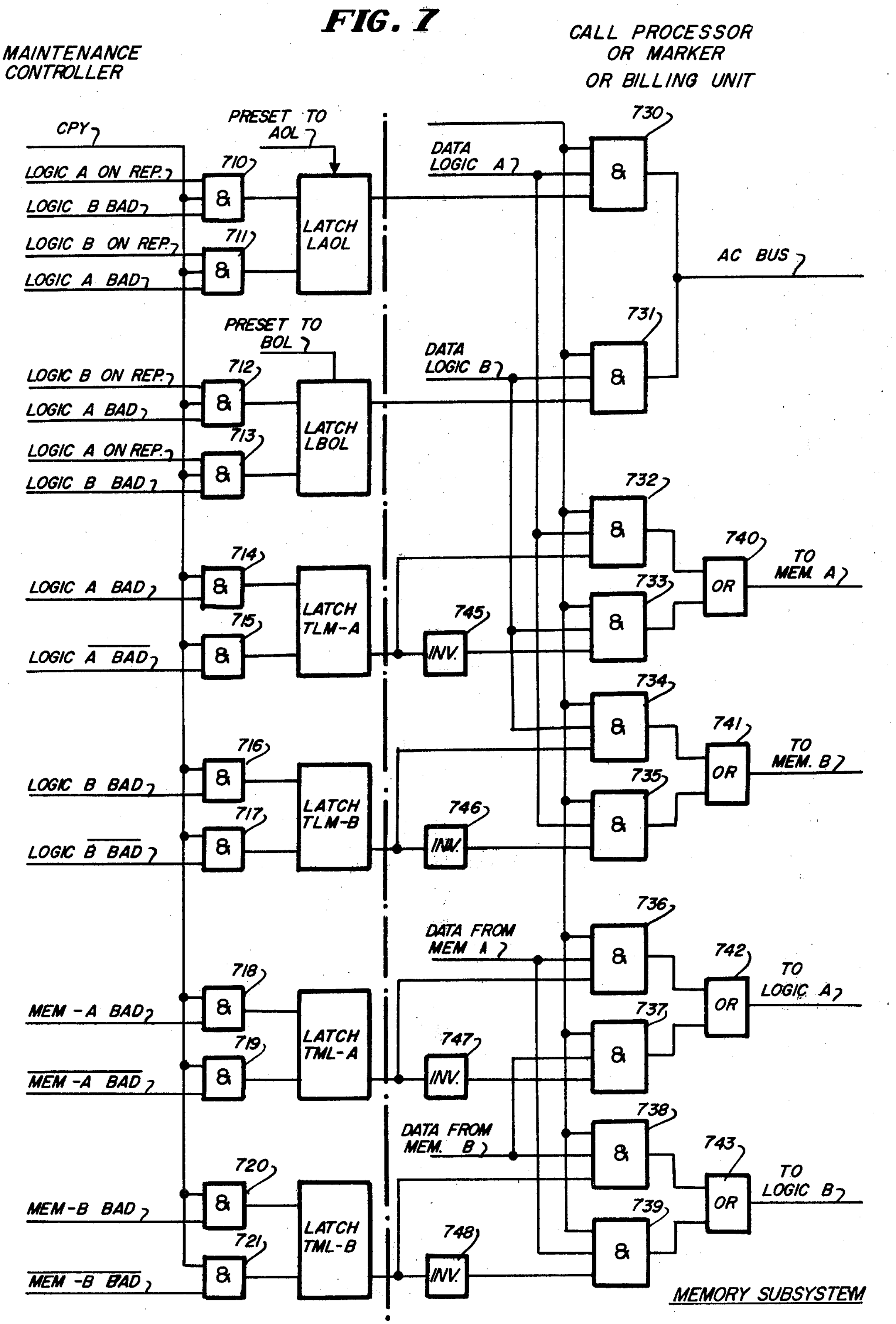
FIG. 7 is a block diagram schematic illustrating the manner in which the electronic subsystems of the system are switched, without interference to the call processing.

In FIG. 7, the manner in which these various system configurations are established is illustrated. As can be seen, the maintenance controller circuit MCC includes a pair of AND gates 710 and 711 which are coupled to set and reset a latch LAOL, respectively, and AND gates 712 and 713 which are coupled to set and reset a latch LBOL, respectively. These latches also can be preset to place either the logic A or the logic B on-line, by means of the leads coupled thereto labeled "PRESET TO AOL" and "PRESET TO BOL". The latch LAOL, upon being set, couples an output to an AND gate 730 within the call processor, the marker, and billing unit, respectively Similarly, the latch LBOL, upon being set, couples an output to an AND gate 731. As indicated above, all of the switching functions are established during a clock pulse CPY, and this clock pulse CPY is coupled to the AND gates 710 and 711, as well as the AND gates 712–721 described more fully below. Initially, assuming both the logics A and B are operational, one or the other of the latches LAOL or LBOL is preset to place logic A or logic B on line.

Assuming that latch LAOL is preset to place logic A on line, during the absence of the clock pulse CPY (when $\overline{CPY}$ is true), the data from logic A will be coupled to AND gate 730 which is enabled by the coincidence of the $\overline{CPY}$ pulse, the signal pulse from the latch LAOL and the data from logic A. From the AND gate 730, the data from logic A is coupled to the peripheral equipment, as illustrated in FIGS. 3–6, via the indicated AC bus. The AND gate 731 is disabled at this time, by the absence of the signal pulse from the latch LBOL.

If now the logic B develops a fault condition, a signal LOGIC B BAD is developed by the status configuration logic SCL and coupled to the AND gates 710 and 713. This signal upon being coupled to the AND gate 710 in coincidence with the clock pulse CPY merely functions to maintain the latch LAOL in its set state, since the logic A already is on-line. If the latch LBOL is in its set state, this signal in coincidence with the clock pulse CPY enables the AND gate 713 to reset the latch LBOL.

If a fault condition should occur in the logic A, the status configuration logic SCL couples a LOGIC A BAD signal to the AND gates 711 and 712. This signal in coincidence with the clock pulse CPY enables the AND gate 711 to reset the latch LAOL, and enables the AND gate 712 to set the latch LBOL. Accordingly, the AND gate 730 now is disabled and the AND gate 731 is enabled so that during time that $\overline{CPY}$ is true, the data from logic B is coupled through the AND gate 731 to the AC bus to the peripheral equipment. It can therefore be seen that during the clock pulse CPY, switching is accomplished to place one or the other of the logics A and B on repair and the other on-line.

If logic B had initially been on-line and subsequently developed a fault condition, switching would be accomplished in the same manner as described above, to place the logic A on line.

The maintenance controller circuit MCC also contains a pair of AND gates 714 and 715 coupled to latch TLM-A and a pair of AND gates 716 and 717 coupled to a latch TLM-B.

Assuming that both logic A and logic B are operational, the status configuration logic SCL provides $\overline{\text{LOGIC A BAD}}$ and $\overline{\text{LOGIC B BAD}}$ signals to the AND gates 715 and 717, respectively, and these signals during the coincidence of the clock pulse CPY enables these AND gates to reset the latches TLM-A and TLM-B. With these latches in their reset state, when $\overline{CPY}$ is true, the data from logic A is coupled through the AND gate 732 and the OR gate 740 to the memory A and the data from logic B is coupled through the AND gate 734 and the OR gate 744 to the memory B.

If the logic A should develop a fault condition, the status configuration logic SCL couples a LOGIC A BAD signal to the AND gate 714 and this AND gate upon coincidence of the clock pulse CPY functions to set the latch TLM-A. With the latch TLM-A set, the AND gate 732 is disabled and the AND gate 733 is enabled by the signal coupled to it through the inverter 745. Accordingly, with the latch TLM-A in its reset state, the data from logic B during $\overline{CPY}$ is coupled through the AND gate 733 and the OR gate 740 to the memory A. This same data, as before, is coupled through the AND gate 734 and the OR gate 741 to the memory B. Under these conditions, the logic B therefore is outputting information to both the memory A and the memory B.

Correspondingly, if the logic B should develop a fault condition, the status configuration logic SCL couples a LOGIC B BAD signal to the AND gate 716 and the latter is enabled upon coincidence of the clock pulse CPY to set the latch TLM-B. With this latch set, the AND gate 734 is disabled and the AND gate 735 is enabled by the signal coupled to it through the inverter 746. The data from logic A then is coupled through the AND gate 735 and the OR gate 741 to the memory B, as well as to the memory A via the AND gate 732 and the OR gate 740.

The transfer of the data from the memories A and B to the logics A and B are controlled by the latches TML-A and TML-B. A pair of AND gates 718 and 719 are coupled to the latch TML-A to set and reset this latch, respectively, and a corresponding pair of AND gates 720 and 721 are coupled to the latch TML-B to set and reset this latch, respectively. Assuming that both memories are operational, a $\overline{\text{MEMORY A BAD}}$ and a $\overline{\text{MEMORY B BAD}}$ signal is coupled to the AND gates 719 and 721, respectively. Upon coincidence of these signals and clock pulse CPY, these AND gates 719 and 721 are enabled to reset the latches TML-A and TML-B, respectively. With these latches in their reset state, during $\overline{CPY}$, the data from memory A is coupled to AND gate 736 and the OR gate 742 to the logic A, and the data from memory B is coupled to the AND gate 738 and the OR gate 743 to the logic B. In other words, if both logics A and B and both memories A and B are operational, the logic A reads and writes information into its associated memory A and the logic B reads and writes information into its associated memory B.

In the event that memory A should develop a fault condition, the status configuration logic SCL couples a MEMORY A BAD signal to the AND signal 718 and the latter is enabled upon coincidence of the clock pulse CPY to set the latch TML-A. With this latch set, the AND gate 736 is disabled and the AND gate 737 is enabled by the signal coupled to it through the inverter 747. With the AND gate 737 enabled, during $\overline{CPY}$, data from memory B is coupled through AND gate 737 and the OR gate 42 to the logic A. Correspondingly, this data from memory B is coupled through the AND gate 738 and the OR gate 743 to the logic B. Accordingly, when the memory A is bad or on repair, the data from memory B is coupled to both the logic A and the logic B.

In the event the memory B should develop a fault condition, a MEMORY B BAD signal is coupled from the status configuration logic SCL to the AND gate 720 and the latter is enabled upon coincidence of the clock pulse CPY to set the latch TML-B. With this latch set, the AND gate 738 is disabled and the AND gate 739 is enabled by the signal coupled to it through the inverter 748. Accordingly, at this time, during $\overline{CPY}$, the data from memory A is coupled through the AND gate 739 and the OR gate 743 to the logic B, as well as through the AND gate 736 and the OR gate 742 to the logic A. Therefore, when the memory B is bad or on repair, the data from the memory A is coupled to both the logic A and the logic B.

From the above description, it should also be apparent that a logic which is on repair will not be switched on-line should the on-line logic develop a fault condition, nor will the on-line logic be switched on repair. In such a situation, the logic which is already on-line will be retained on-line, even though it indicates the fault condition. This can be seen in FIG. 7, wherein the logic signal $\overline{\text{LOGIC A ON-REPAIR}}$ is coupled to the AND gates 710 and 713, and the logic signal $\overline{\text{LOGIC B ON-REPAIR}}$ is coupled to the AND gates 711 and 712, to prevent the latches LAOL and LBOL from being set or reset under such circumstances.

From the above description, it can be seen that the maintenance controller MCC detects the failures in logics and/or memories and provides output signals representative of these failures. The manner in which these failures are actually detected and the output signals produced form no part of the present invention. The invention is directed to the manner in which the logics and/or memories are switched, without affecting communication with space shared subsystems, after any failure is detected.

Now that the invention has been described, what is claimed as new and desired to be secured by Letters Patent is:

1. In a common control communication switching system wherein the common controls are duplicated and operated in synchronism, the common controls each including a logic unit portion and an associated memory portion, only one of said logic units being on line and communicating with the space shared subsystems of the communication switching system at any one time, a maintenance controller means for checking the operation of the logic units and memories and for providing output signals indicating the failure of one or both of the logic units or memories, an arrangement for switching the duplicated synchronously operating logic units and memories in the event of the failure of the on line logic unit or one of the memories without effecting the communication with the space shared subsystems comprising: (a) first latch means operable to set said logic units on line or on standby, said first latch means normally being operated to preset one of said logic units on line and the other one thereof on standby (b) means operated upon the coincident occurrence of an output signal from said maintenance controller means indicating the failure of said on line logic unit and a system timing pulse occurring during the time said on line logic unit is not communicating with said space shared subsystems to switch said logic units so that the on line logic unit is set on standby and the logic unit on standby is set on line; and (c) first gating means for gating said logic units to and in communication with said space shared subsystems coupled to and controlled by said first latch means to gate only said one line logic unit to and in communication with said space shared subsystems, whereby switching of the logic units in the event of a failure of the on line logic unit is controlled by said first latch means and is accomplished during the time that the on line logic unit is not communicating with the space shared subsystems so that the communication with the space shared subsystems is not affected.

2. In a common control communication switch system, the arrangement of claim 1 wherein data normally is transferred between each of said logic units and its associated memory, further including:

a. second gating means for gating the data from each of said logic units to said memories;

b. second latch means coupled to and controlling the operation of said second gating means, said second latch means normally being operated to enable said second gating means to gate the data from each of said logic units to its associated memory and being operated upon the coincident occurrence of an output signal from said maintenance controller means indicating the failure of one of said logic units and said system timing pulse to enable said second gating means to gate the data from the logic unit which has not failed to both of said memories, whereby the failed logic unit is prevented from contaminating its associated memory.

3. In a common control communication switching system, the arrangement of claim 1 wherein data normally is transferred between each of said logic units and its associated memory, further including:

a. third gating means for gating the data from each of said memories to said logic units;

b. third latch means coupled to and controlling the operation of said third gating means, said third latch means normally being operated to enable said third gating means to gate the data from each of said memories to its associated logic unit and being operated upon the coincident occurrence of an output signal from said maintenance controller means indicating the failure of one of said memories and said system timing pulse to enable said third gating means to gate the data from the memory which has not failed to both of said logic units.

4. In a common control communication switching system, the arrangement of claim 2 wherein data normally is transferred between each of said logic units and its associated memory, further including:

a. third gating means for gating the data from each of said memories to said logic units;

b. third latch means coupled to and controlling the operation of said third gating means, said latch means normally being operated to enable said third gating means to gate the data from each of said memories to its associated logic unit and being operated upon the coincident occurrence of an output signal from said maintenance controller means indicating the failure of one of said memories and said system timing pulse to enable said third gating means to gate the data from the memory which has not failed to both of said logic units.

* * * * *